United States Patent [19]
Athens et al.

[11] Patent Number: 6,158,924
[45] Date of Patent: Dec. 12, 2000

[54] SOIL AND GROUNDWATER DECONTAMINATION SYSTEM WITH VACUUM EXTRACTION

[76] Inventors: Nick Athens, 1651 Hadaway Ct., Kennesaw, Ga. 30152; David M. Goodrich, 142 Douglas Fir Dr., Waleska, Ga. 30103

[21] Appl. No.: 09/295,022

[22] Filed: Apr. 20, 1999

[51] Int. Cl.$^7$ ....................................................... B09C 1/08
[52] U.S. Cl. ...................... 405/128; 166/275; 166/270.1; 166/268; 166/90.1
[58] Field of Search ............................... 405/128; 166/52, 166/90.1, 75.12, 268, 270.1, 275

[56] References Cited

U.S. PATENT DOCUMENTS

| | | | |
|---|---|---|---|
| 4,591,443 | 5/1986 | Brown et al. | 210/747 |
| 4,867,238 | 9/1989 | Bayless et al. | 166/261 |
| 5,050,676 | 9/1991 | Hess et al. | 166/267 |

(List continued on next page.)

OTHER PUBLICATIONS

EPA—How to Evaluate Alternative Cleanup Technologies for Underground Storage Tank Sites, May 1995, 38 pgs.
Rapid Delivery System Completes Oxidation Picture, Soil & Groundwater Cleanup, Aug.–Sep. 1998, 11 pgs.
Onsite Direct Chemical Oxidation of Soil Contaminants with Hydrogen Peroxide, Solvay Interox, H7–562(Oct. 1993).
Fenton's Reagent, Solvay Interox, H7–214 (Sep. 1992).
In–Situ Chemical Oxidation of Trichloroethylene Using Hydrogen Peroxide, by Gates and Siegrist Sep. 1995, 6 pgs.
Oxidizing Agent Can Finish Cleanup Where Other Systems Taper Off, by Andrews and Greenberg, Jul. 1997, 4 pgs.
Chemical Oxidation of Chlorinated Organics by Hydrogen Peroxide in the Presence of Sand, by Ravikumar and Gurol, Environ. Sci. Technol., vol. 28, No. 3, 1994, 7 pgs.
OxyVac Success Stores, 022097–1, 6 pgs. (No Date).
Common Questions Relating to Geo–Cleanse, 18 pgs. (No Date).
Geo–Cleanse Midwest, 3 pgs. (No Date).
MTBE or not MTBE? Soil & Groundwater Cleanup, May 1997, 7 pgs.
Hydrogen Peroxide for Physicochemically Degrading Petroleum–Contaminated Soils, by Watts, Remediation/Autumn 1992, 13 pgs.

*Primary Examiner*—Eileen D. Lillis
*Assistant Examiner*—John Kreck
*Attorney, Agent, or Firm*—Thomas, Kayden, Horstemeyer & Risley, L.L.P.

[57] ABSTRACT

A soil and groundwater decontamination system (10) and associated process are provided for soil and groundwater remediation. The system (10) and process utilizes both a physical or chemical reaction with the contaminants in a contaminated subsurface zone and extraction of the reaction end products and any remaining contaminants from the contaminated subsurface zone (100). In architecture, the soil and groundwater decontamination system (10) comprises an chemical product (12) that is introduced into an injection well (18). The injection well (18) is disposed into a passage provided in or adjacent to the contaminated subsurface zone (100) and allows the introduction of the chemical product (12) (and catalyst (24) if necessary) into the contaminated subsurface zone (100). The chemical product (12) reacts (physically or chemically) with contamination in the soil and groundwater and creates a reaction end product. The soil and groundwater decontamination system (10) further includes a vacuum pump (15) in fluid connection with a drop tube (22), and an optional air supply (16) in fluid communication with a well casing (18). The drop tube (22) includes an opening and is disposed longitudinally inside the well casing (20). The reaction end products and remaining contaminants are drawn into an opening in the well casing (20) and into the opening disposed in the drop tube (22), thereby extracting the reaction end products and remaining contaminants from the soil and groundwater in a preferably integrated dual-phase flow of vapor phase and liquid phase in one common stream.

4 Claims, 2 Drawing Sheets

U.S. PATENT DOCUMENTS

| | | | |
|---|---|---|---|
| 5,111,883 | 5/1992 | Savery | 166/269 |
| 5,172,764 | 12/1992 | Hajali et al. | 166/267 |
| 5,249,888 | 10/1993 | Braithwaite | 405/128 |
| 5,251,700 | 10/1993 | Nelson et al. | 405/128 |
| 5,254,761 | 10/1993 | Parker | 585/250 |
| 5,277,250 | 1/1994 | Dela | 166/90.1 |
| 5,286,141 | 2/1994 | Vigneri | 405/128 |
| 5,346,330 | 9/1994 | Bernhardt | 405/128 |
| 5,360,067 | 11/1994 | Meo | 166/256 |
| 5,376,182 | 12/1994 | Everett et al. | 134/25.1 |
| 5,443,118 | 8/1995 | Yannimaras et al. | 166/251 |
| 5,456,550 | 10/1995 | Devlin | 405/128 |
| 5,472,294 | 12/1995 | Billings et al. | 405/128 |
| 5,509,757 | 4/1996 | Croy | 405/128 |
| 5,584,605 | 12/1996 | Beard et al. | 405/128 |
| 5,611,642 | 3/1997 | Wilson | 405/128 |
| 5,615,974 | 4/1997 | Land et al. | 405/128 |
| 5,653,288 | 8/1997 | Billings et al. | 166/305.1 |
| 5,709,505 | 1/1998 | Williams et al. | 405/258 |
| 5,741,427 | 4/1998 | Watts et al. | 210/747 |
| 5,803,664 | 9/1998 | Kawabata et al. | 405/128 |
| 5,967,230 | 10/1999 | Cooper et al. | 166/245 |

SOIL AND GROUNDWATER DECONTAMINATION SYSTEM WITH VACUUM EXTRACTION

BACKGROUND OF THE INVENTION

The present invention is generally related to an apparatus and process for removing contamination in various phases from contaminated soil and groundwater. More particularly, the present invention is related to a soil and groundwater decontamination system and method for decontamination of soil and groundwater by reaction and extraction.

Various organic contaminants can be found in a contaminated subsurface zone, including the groundwater and soil, such as hydrocarbon compounds including volatile organic compounds (VOCs), semi-volatile organic compounds, and nonvolatile materials, and the like. Sources of surface and subsurface contamination are numerous, for example, leaking underground storage tanks, industrial, and manufacturing operations, chemical storage in process areas, chemical spills, waste disposal areas, etc. Among common contaminants from these sources are petroleum hydrocarbons, such as benzene, toluene, ethylbenzene, xylene, gasoline, diesel fuel, fuel oil, jet fuel, and others. Contaminants can exist in subsurface soil and in groundwater, below the water table, in various phases as discrete substances and mixed with and/or dissolved in groundwater and soil gases. Such contaminants can occur in the vapor phase in the vadose (unsaturated) zone, in the free (separate) phase floating on top of the groundwater (or dense non-aqueous phase liquid (DNAPL) at the base of an aquifer), dissolved phase in the groundwater, and in the absorbed phase in the unsaturated (vadose) zone and saturated groundwater zone below the water table.

A number of techniques are known for removal of soil contaminants and remediation of effected soil. One such technique involves the excavation and treatment of the soil on- or off-site by means such as incineration, chemical treatment, or biological treatment. However, when soil contaminated with volatile organic compounds is excavated, up to about 90 percent of the contaminants may volatize to the atmosphere. Also, there exists concerns regarding landfilling of such materials.

Another technique involves saturating the contaminated soil with water in-situ (soil flushing), causing the contaminants to be slowly leached from the soil by the water. The contaminated water can then be removed. Other common methods include groundwater pump and treat and air sparging.

Vacuum extraction techniques have also been proposed for removing VOCs from soil. Known soil vapor vacuum extraction provides an apparatus and process by which volatile vapors may be extracted from the soil through subsurface vacuum application above the resting water table, thereby extracting vapors present in the vadose zone. There are many problems associated with the soil vapor vacuum extraction process. When a single tube extraction well or well casing is disposed to a depth below the water table surface and a vacuum is applied at the unsubmerged end of the well casing, the resting water table surface can become dynamic resulting in the water table surface moving upward in the area adjacent the well casing, essentially forming a peak and resulting in "upwelling." This upwelling can cause floating contaminants just above the water table surface (in the capillary fringe where up to 80 or 90 percent of the contaminants can reside) to float or gravitate away from the well casing, resulting in a less treatable capillary fringe and the undesired consequence of migration of the floating contamination. Further, the upward movement of the water table surface adjacent the well casing can effectively "seal" the extraction well and prevent the well casing from ingesting the air necessary to maintain the vacuum for extraction.

Dual-phase extraction (also commonly referred to as multi-phase extraction) is yet another technique for removing vapor phase adsorbed phase, liquid phase and dissolved phase VOCs and semi-volatile organic compounds from impacted soils and ground water. Known dual-phase extraction provides an apparatus and process by which volatile vapors and liquids may be extracted from the soil. There are two primary methods known for such dual-phase extraction.

In a first known method of dual-phase vacuum extraction multiple pumps are employed to extract vapor and liquid phases. As such, in addition to the use of the vacuum extraction to extract vapors, a downhole mechanical pump is also introduced into the contaminated soil to extract contaminants present in the difficult to treat saturated zone. While this technique extracts both liquid and vapor phases, it does so in separate streams and through the use of two distinct steps or operations, thereby being less efficient and requiring more resources to be devoted to such a clean-up than where the liquid and vapor phases can be extracted simultaneously and in the same step or operation. An example of such an apparatus and method can be found in U.S. Pat. No. 5,615,974 (Land, et al.)

In a second known method of dual-phase extraction a single pump system is employed to extract vapor and liquid phases. As such, the vacuum extraction provides for the simultaneous removal of the liquid phase and gas phase in one common integrated stream through one common conduit. This process will hereafter be referred to "integrated dual-phase extraction." Such integrated dual-phase extraction can generally be achieved by inserting at least a portion of an extraction well below the resting water table surface of the contaminated subsurface zone.

An example of an integrated dual-phase extraction process and apparatus are disclosed in U.S. Pat. No. 5,050,676 (Hess, et al.), the disclosure of which is herein incorporated by reference. Disclosed is integrated dual-phase extraction for removal of contaminants in the soil and groundwater where the contaminants are in the dissolved phase, liquid phase, and the vapor phase simultaneously in one common integrated stream. The apparatus disclosed includes a vacuum generating device connected to one end of a well casing that is disposed in a first borehole. At least one air inlet well is located in a second separate borehole. The well casing is a single tube configuration.

Another example of an integrated dual-phase vacuum extraction process and apparatus is disclosed in U.S. Pat. No. 5,172,764 (Hajali, et al.), the disclosure of which is herein incorporated by reference. Disclosed is an apparatus and process for removing contaminants from a contaminated subsurface zone when those contaminants are in the absorbed phase, dissolved phase, liquid phase, and/or the vapor phase. The disclosed vacuum system includes a dual pipe configuration having a perforated well casing inside of which is situated a drop tube. The inner drop tube has an opening and the well casing has an air inlet at or near the ground surface. The air inlet permits the introduction of air at any desired pressure, including reduced pressures, atmospheric pressure, or increased or forced pressures into the well casing. The air inlet may also be used to introduce other chemicals or materials into the well casing. Substances introduced by the air inlet into the well casing pass downwardly through the well casing. A vacuum pump is connected to an end of the extraction pipe that remains above ground level, thereby drawing contaminants from the saturated and/or unsaturated (vadose) soil surrounding the perforated region of the well casing through the perforations and into the vacuum extraction pipe, then upwardly with the liquid and vapor mixture through the drop tube. Substances introduced by the air inlet into the well casing pass upwardly with the contaminants through the drop tube. The drop tube draws contaminants from the soil and groundwater in the vapor, dissolved, and liquid phases concurrently in a single step and operation.

The use of a physical reaction, a chemical reaction or a combination thereof for treatment of waste water and petroleum contaminated groundwater is generally known to those skilled in the art. Specifically, the use of chemical oxidation for treatment of wastewater and petroleum contaminated groundwater has been studied extensively and implemented in the wastewater and environmental industries. This oxidation process has been carried out using numerous oxidizing agents, for example, ozone, hydrogen peroxide ($H_2O_2$), ozone in conjunction with ultraviolet light, etc.

Fenton's reaction was initially identified approximately 100 years ago and is a process that has been utilized in the wastewater treatment industry for a number of years. The reaction, when carried to completion, simply involves the use of hydrogen peroxide ($H_2O_2$—10–50% concentration) in the presence of a catalyst (e.g., a metallic salt such as iron sulfate ($FeSO_4$), which in many instances in naturally occurring in the soil) to form hydroxyl radicals (OH•) that have the potential to ultimately reduce hydrocarbons to carbon dioxide and water. The process is simplified below:

$$H_2O_2 + catalyst + hydrocarbon \rightarrow CO_2 + H_2O$$

This equation greatly simplifies the intermediate steps of this chemical reaction. It is also noted that there are several different places on organic compounds which the hydroxyl radicals can attach, hence, many different (intermediate) products can be formed during the course of this reaction. Oxidation reactions during Fenton's reaction are complex and it is difficult to predict which intermediate products will be formed. This reaction is most "efficient" at low pH ranges (pH of ~3), which is generally not practical to create in the subsurface. The low pH requirement of optimum Fenton's reaction appears to be related to the need for soluble iron in the system and the reducing conditions to regenerate iron (II). Richard J. Watts, *Hydrogen Peroxide for Physiochemically Degrading Petroleum-Contaminated Soils*, Remediation, Autumn 1992.

Hydrogen peroxide in this process is utilized in a different fashion when compared to its typical use in the environmental restoration industry (i.e. as an oxygen source to enhance aerobic biodegradation). This same benefit exists in the Fenton reaction process, however, the primary use of hydrogen peroxide is to generate the hydroxyl radicals, a very powerful (second only to fluorine gas in oxidation potential) and effective nonspecific oxidizing agent which vigorously reduces hydrocarbon chains and rings to carbon dioxide and water when carried to completion.

Additionally, in-situ treatment of a contaminated subsurface zone via physical reaction caused by surfactants and co-solvents is generally known in the art. Although, the use of surfactants and co-solvents for the enhanced recovery of crude oil has been in use for many years, the utilization of surfactants and co-solvents for the enhanced recovery of organic contaminants is a relatively new application. A surfactant (surface acting agent), is a chemical compound that is both hydrophobic ("water fearing") and hydrophilic ("water loving") and has the potential of altering the properties of fluid interfaces. The hydrophobic portion of the surfactant is typically a long hydrocarbon chain, while the hydrophilic portion of the surfactant often includes anion or cations. Surfactants are typically highly soluble in water due to the hydrophilic portion of the surfactant. When a surfactant is introduced in subsurface environments where organic contamination resides, the hydrophobic portion of the surfactant may be attracted to the organic contaminant, while the hydrophilic portion of the surfactant will be oriented toward the water phase, resulting in the accumulation of surfactant monomers at the organic contaminant/water interface or the water/air interface. The introduction of surfactants into the subsurface can achieve two different results-enhanced mobilization of the organic contaminant, and enhanced solubilization (into water) of the organic contaminant, as described below.

Co-solvents are chemical agents, typically alcohols, that can be either utilized to enhance the performance of surfactants, or by themselves to enhance organic contaminant aqueous mobilization or dissolution, similar to that of the surfactant.

Enhanced mobilization of an organic contaminant results where the surfactant reduces the organic contaminant/water interfacial tension. This reduction in interfacial tension diminishes the influence of capillary forces, which are responsible for the retention of the organic contaminant in its residual (adsorbed) and liquid (separate) phases. Physical mobilization of the organic contaminant occurs when sufficient lowering of the interfacial tension between the organic contaminant and water is present.

With respect to enhanced solubilization of the organic contaminant into water, the aqueous solubility of the organic contaminant is increased, thereby "dissolving" the residual (adsorbed) phase and/or liquid (separate) phase organic contaminant into water.

Prior uses of surfactants and co-solvents for subsurface cleanup of organic contaminants have typically involved the injection of these fluids into the subsurface only, or in conjunction with a groundwater withdrawal system using a downhole mechanical pump (i.e. "pump and treat" technology).

However, treating contaminated soil and/or groundwater purely by a reaction process does not address the issue of the need to capture the off-gases and fugitive vapors which result from the reaction (particularly, the Fenton's reaction) or from the undesired displacement of fugitive vapors from the injection (positive pressure) process. Such off-gases and vapors may find pathways of escape, for example, in existing sewer lines, which can result in an unsafe build up of pressure and/or hazardous/explosive vapors underground, creating a safety hazard. Additionally, pure reaction treatment can suffer from insufficient distribution of the chemical product (i.e. the oxidizing agent, surfactant and/or co-solvent) throughout the contaminated subsurface zone.

Further, a single tube configuration for dual-phase extraction can be limited in its use depending on depth of application and porosity of the contaminated subsurface zone in which the extraction is to be used.

Thus, a heretofore unaddressed need exists in the industry for an improved soil remediation system and/or process to address at least the aforementioned deficiencies and inadequacies.

BRIEF SUMMARY OF THE INVENTION

The present invention generally provides a decontamination system and a method for efficiently removing vapor, adsorbed, dissolved and liquid phase contaminants in-situ from a contaminated subsurface zone, including the soil and groundwater in the contaminated zone. The system and method utilize a combination of physical and/or chemical reaction of contaminants in a contaminated subsurface zone (including both contaminated soil and contaminated groundwater) and integrated dual-phase extraction of multiple phases of organic contaminants, reaction end products resulting from reaction, and any remaining contaminants. A combination of the reaction and extraction is beneficial because the extraction process aids in the effectiveness of the reaction by inducing circulation of the product throughout the contaminated subsurface zone.

Briefly described, in architecture, the soil and groundwater decontamination system essentially comprises a product (i.e. an oxidizing agent such as $H_2O_2$, a surfactant, and/or a co-solvent) that is introduced into the contaminated subsurface zone. The product is preferably introduced by an injection well. The injection well is of a predetermined length and is submerged into a bored passage in the contaminated zone. An (optional) injection pump can be used to inject the product into the contaminated zone via the injection well, thereby enhancing the distribution of the product in the subsurface allowing the product to react (chemically and/or physically) with contamination in the soil and groundwater. Optionally, a catalyst can be introduced into the contaminated zone to facilitate the reaction between the product (e.g. when the oxidizing agent $H_2O_2$ is utilized) and the contaminants. The decontamination system further includes integrated dual-phase extraction capability. The integrated dual-phase extraction capability essentially comprises a drop tube disposed inside a well casing. The drop tube is in dual-phase (i.e. gas and liquid) fluid communication with a vacuum pump. The well casing, with the drop tube to be disposed therein, is introduced into the contaminated subsurface zone. The well casing and drop tube are configured to allow the passage of vapor and liquid therethrough.

In operation, the transport of the product (and accordingly the chemical or physical reaction) is enhanced by the integrated dual-phase extraction process. The reaction end products resulting from the reaction, as well as the remaining contaminants in the soil and/or groundwater, are drawn first into the well casing. Once the elements have entered the well casing, they are drawn into a distal opening and/or into one or more lateral wall apertures disposed in the drop tube, thereby simultaneously extracting the reaction end products and remaining contaminants from the soil and groundwater. The extraction is an integrated dual-phase of both gases and liquids in one common stream.

The present invention can also be viewed as providing a method for decontamination of a contaminated subsurface zone via a physical and/or chemical reaction combined with integrated dual-phase extraction. In this regard, the method can be broadly summarized by the following steps. A product is introduced into the contaminated subsurface zone to be treated. The product is preferably pumped or gravity fed into an injection well, the injection well allows introduction of the product into the contaminated zone. The product, in the presence of a catalyst, when needed (injected and/or indigenous), reacts with the contaminants in the contaminated subsurface zone and produces one or more reaction end products. A well casing is disposed into the contaminated subsurface zone and a drop tube is disposed inside the well casing. Optionally, air may be supplied at the surface to the well casing, thereby occupying the (annular) space surrounding the drop tube and a vacuum is produced in the drop tube. The reaction end products and remaining contaminants pass into the well casing and into a distal opening and/or lateral wall apertures in the drop tube and are extracted from the contaminated zone through the drop tube. Transport of the product throughout the contaminated zone is also greatly enhanced by the integrated dual-phase extraction process. For the integrated dual-phase extraction, a vapor-liquid separation after extraction, may optionally be provided. Individual-phase treatment at the surface may then optionally be provided, as needed.

In accordance with another aspect of the present invention, a catalyst may be introduced into the subsurface zone, for example, when there is not a sufficient amount of catalyst naturally occurring in the soil and/or groundwater.

The present invention has numerous advantages, a few of which are delineated hereafter as merely examples.

An advantage of the present invention is that it is efficient at removing all phases (i.e. adsorbed, vapor, dissolved, and liquid phases) of organic contaminants in-situ simultaneously from both the vadose zone and saturated zone in a common stream.

Another advantage of the present invention is that it provides for a soil and groundwater decontamination process that utilizes both a chemical and/or physical reaction and integrated dual-phase extraction, such that the extraction enhances the effectiveness of the reaction process by facilitating transport and circulation of the product (and, accordingly, the physical or chemical reaction involving the organic contaminants). In other words, there is a synergistic effect between the reaction and integrated dual-phase extraction processes.

Another advantage of the present invention is that it provides an ability to remove fugitive vapors and offgases that may result from the reaction within the contaminated subsurface zone that might otherwise spread or accumulate and result in an explosive or hazardous condition.

Another advantage of the present invention is that extraction can occur at multiple levels, and at increased depths, (a) in the vadose zone of the soil; (b) under the actual "resting" or dynamic water table; or (c) in both the vadose zone and saturated zones.

Another advantage of the present invention is that the unused product, the end reaction products and the contaminants existing in various phases can be removed from a contaminated subsurface zone in one process.

Other features and advantages of the present invention will become apparent to one skilled in the art upon examination of the following drawings and detailed description. It is intended that all such additional features and advantages be included herein as if taught by the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
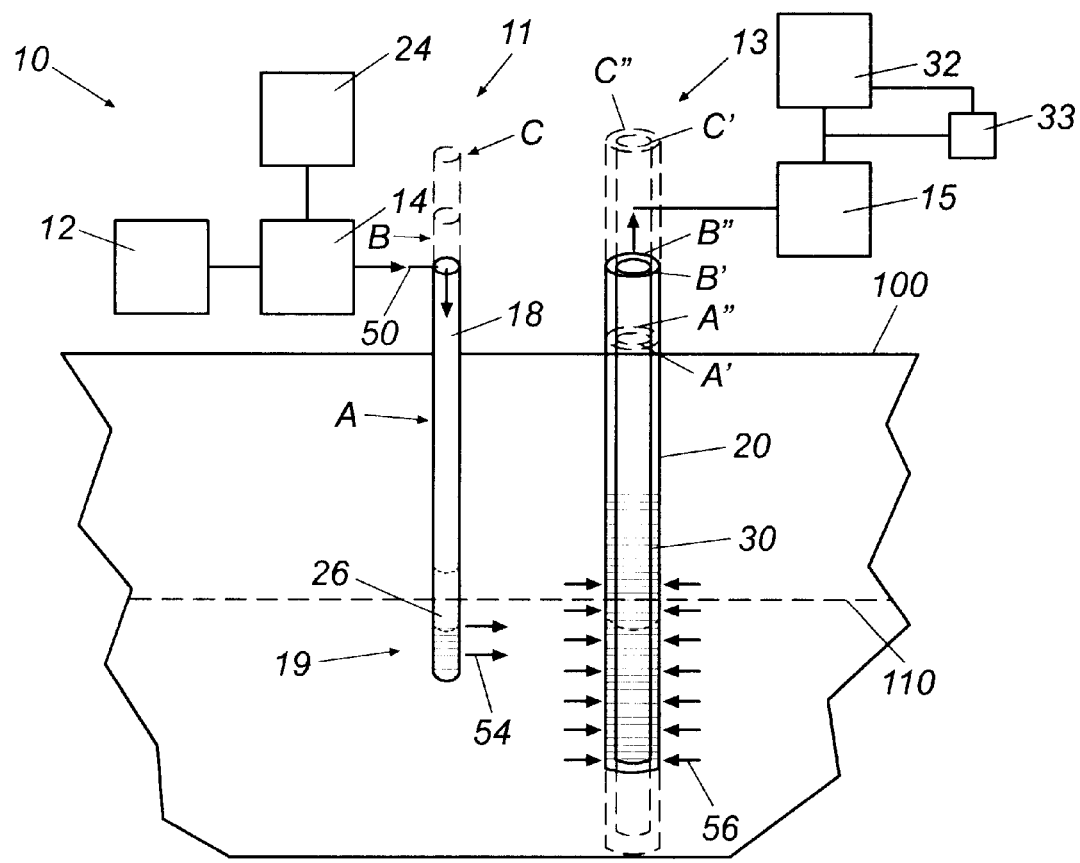
FIG. 1 is a diagram of the soil and groundwater decontamination system in accordance with the present invention, having an injection well apparatus and an extraction well (i.e. well casing with a drop tube implaced in it) apparatus.

FIG. 1 illustrates a soil and groundwater decontamination system 10, which includes an injection well apparatus 11 and an extraction well apparatus 13. The injection well apparatus 11 and the extraction well apparatus 13 are preferably operated together to efficiently remove contaminants from the vadose zone of the soil, the saturated zone of the soil, or both.

The injection well apparatus 11 is designed to inject a product 12. In a preferred embodiment, the injection well apparatus 11 includes the product 12, a fluid pump 14, and an injection well 18. The product 12 is in fluid communication with the injection well 18 via the fluid pump 14. In a preferred embodiment, the injection well 18 is an elongated cylindrical pipe made from any suitable material, for example but not limited to, polyvinyl chloride (PVC), galvanized steel, carbon steel, or stainless steel. It is preferred that the injection well 18 include one or more apertures for example but not limited to, openings created by a lateral wall "screen" 26, apertures drilled or cut into the lateral wall of the injection well 18. It is preferable that the screen 26 be disposed fully below the resting (not dynamic) water table surface 110 (position A). However, the injection well 18 may be disposed within the contaminated subsurface zone 100 such that the screen 26 is located either fully above the resting water table surface 110 (position C), fully below the resting water table surface 110, or partially below and partially above the resting water table surface 110 (position B). It is preferred that (but not limited to) the product injected is an oxidant, a surfactant, a co-solvent, or a combination thereof.

In a first preferred embodiment, the product 12 introduced is an oxidizing agent, such as $H_2O_2$. The oxidizing agent is pumped, by a fluid pump 14, or gravity fed into the contaminated subsurface zone 100 through the injection well apparatus 11. For proper reaction between the oxidizing agent $H_2O_2$ and contaminants to occur, a sufficient amount of a catalyst must be present in the contaminated subsurface zone 100. A sufficient amount of catalyst may be naturally present in the contaminated subsurface zone. However, if needed, a catalyst 24 may be introduced into the contaminated subsurface zone 100, preferably through the injection well apparatus 11. Similar to the oxidizing agent, the catalyst 24 is preferably introduced into the contaminated subsurface zone 100 through the screen 26 of the injection well 18. The catalyst 24 may be injected as a separate step before or after the oxidizing agent has been introduced into the injection well 18, thereby resulting in mixture of the catalyst 24 and the oxidant upon introduction into the contaminated subsurface zone 100 by the injection well 18. Alternatively, the catalyst 24 may be simultaneously injected with the oxidizing agent.

In a second preferred embodiment, the product 12 introduced is a surfactant. The surfactant is pumped, by a fluid pump 14, or gravity fed into the contaminated subsurface zone 100 through the injection well apparatus 11. Optionally, if needed, a co-solvent may also be introduced into the contaminated subsurface zone 100 with the surfactant, as a combined or separate step. Similar to the first preferred embodiment, it is preferable that the surfactant is introduced into the contaminated subsurface zone 100 through the screen 26 of the injection well 18. If desired, the co-solvent may be combined with the surfactant before, or after, the surfactant and co-solvent have been introduced into the injection well, thereby resulting in mixture of the surfactant and the co-solvent upon introduction into the contaminated subsurface zone 100 by the injection well 18.

In a third preferred embodiment the product 12 introduced is a co-solvent. The co-solvent is pumped, by the fluid pump 14, or gravity fed into the contaminated subsurface zone 100 through the injection well apparatus 11. Similar to the other embodiments it is preferable that the co-solvent is introduced into the contaminated subsurface zone 100 through the screen 26 of the injection well 18.

In a fourth preferred embodiment, the product 12 introduced can be any combination of oxidizing agent, catalyst, surfactant, and/or co-solvent. The combination product 12 is pumped, by the fluid pump 14, or gravity fed into the contaminated subsurface zone 100 through the injection well apparatus 11. Similar to the other embodiments disclosed above, it is preferable that the product 12 is introduced into the contaminated subsurface zone 100 through the screen 26 of the injection well 18.

Figure 2:
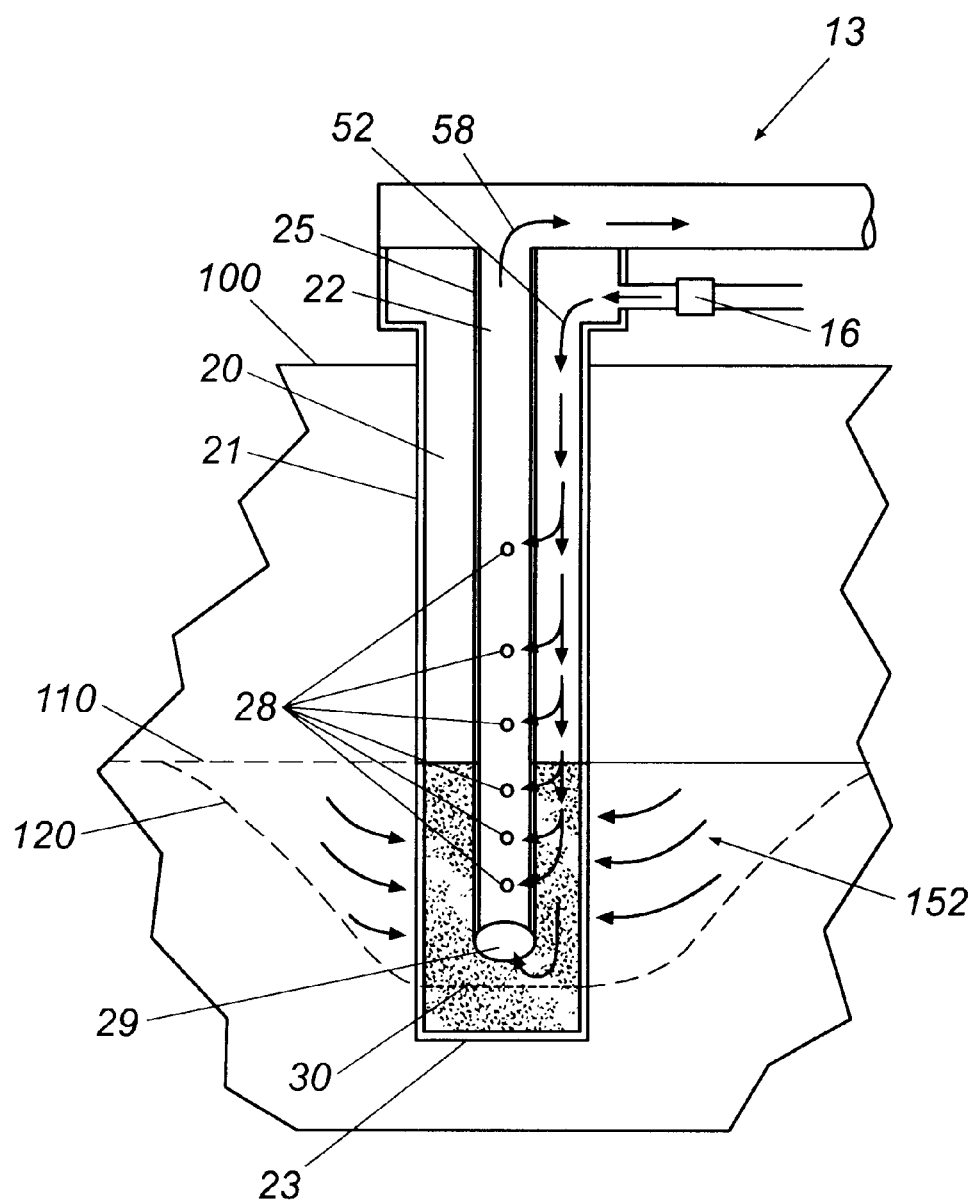
FIG. 2 is a side cutaway view of the extraction well apparatus of FIG. 1 showing a well casing and a drop tube situated therein.

Referring now to the integrated dual-phase extraction well apparatus 13 of FIGS. 1 and 2, the extraction well apparatus 13 includes a vacuum pump 15, an optional but preferred air supply valve 16, for example, an air inlet or pressurized air source, a well casing 20, and a drop tube 22. The drop tube 22 is preferably an elongated cylindrical pipe disposed internal to and extending longitudinally along the well casing 20. The drop tube 22 can be made from any suitable material, for example but not limited to, polyvinyl chloride (PVC), galvanized steel, carbon steel, or stainless steel. The drop tube 22 preferably includes a distal opening 29 at a distal end and, optionally, one or more lateral wall apertures 28 (perforations) disposed along the length of the drop tube 22, and is in fluid communication with the vacuum pump 15. The well casing 20 is preferably an elongated cylindrical pipe made of any suitable material, such as polyvinyl chloride (PVC), galvanized steel, stainless steel or carbon steel, and is in fluid communication with the air supply 16 which allows air, optionally and variably, to enter the well casing 20 as desired. Preferably, the well casing 20 preferably includes perforations, such as those created by circumferential screening 30, towards the distal end 23 of the well casing 20 and is further preferably closed at the distal end 23.

The drop tube 22, disposed inside the well casing 20, may be submerged in the contaminated subsurface zone 100 such that the lateral wall apertures 28 are disposed either fully below the resting water table surface 110 (position A'), fully above the resting water table surface 110 (position C'), or partially below and partially above the resting water table surface 110 (position B'). The well casing 20 may be disposed in the contaminated subsurface zone 100 such that the perforation 30 is located fully below the resting water table surface 110 (position A"), fully above the resting water table surface 110 (position C"), or partially below and partially above the resting water table surface 110 (position B").

Optionally, the extraction well apparatus 13 may also include a contaminant filter 32 and/or a contaminant treatment means 32. In this embodiment, the contaminant filter 32 is in fluid communication with the vacuum pump 15. The contaminant filter 32 is preferably used to treat all extracted phases from the contaminated subsurface zone 100 to produce an environmentally suitable product.

In a preferred method for reaction and integrated dual-phase extraction from contaminated soil, groundwater, or both, at least two passages are provided into the contaminated subsurface zone 100. Preferably an injection well 18 and a well casing 20 are disposed in separate bore holes in the contaminated subsurface zone 100. Generally, the injection well 18 introduces a product 12 into the contaminated subsurface zone 100. More specifically, the product is preferably (but not limited to) introduced into the saturated zone below the resting water table surface 110. The product 12 can be pumped into the injection well 18 by the fluid pump 14 or introduced by gravity feeding. Introduction of a product 12 or a combination of products into the contaminated subsurface zone 100 results in a desirable chemical and/or physical reaction for in-situ treatment of the contaminated subsurface zone. The product(s) reacts with the contaminants that exist within the subsurface zone 100.

In the first preferred embodiment, the oxidizing agent is introduced into the contaminated subsurface zone 100, with a catalyst, if needed. The reaction, when involving $H_2O_2$ as the oxidizing agent is catalyzed by the catalyst, either naturally occurring in the soil or introduced into the injection well 18, ultimately resulting in water and carbon dioxide (reaction end products) when the reaction is carried to completion. The reaction end products may also include various other by-products.

In the first preferred embodiment, it is desirable to introduce the oxidizing agent and the catalyst 24 to the injection well 18 separately, allowing mixture to occur within the contaminated subsurface zone 100. The catalyst 24 can be introduced before or after the oxidizing agent is introduced, or simultaneously with the oxidizing agent. All of the various combinations of introducing the catalyst 24 and the oxidizing agent $H_2O_2$, and the mixture thereof described above, result in an exothermic reaction. Since the oxidizing agent will naturally inject into soil where there exists the least resistance, it is preferable that the injection well 18 is disposed into the contaminated soil/groundwater 100 to a depth such that the screen 26 is disposed completely below the resting water table surface 110. This positioning forces the introduction of the oxidizing agent below the water table surface 110, rather than allowing oxidizing agent to be introduced into the contaminated soil in the non-saturated or vadose zone, above the water table surface 110. It should be noted that the injection well 18 may be disposed into the contaminated subsurface zone 100 to any depth. The end reaction products from the oxidation reaction, the contaminants that remain in the contaminated zone, and fugitive vapors and offgases are then removed via the integrated dual-phase extraction process. It should, however, be noted that the dual-phase extraction process, discussed below, also facilitates transport of the oxidizing agent and catalyst (and, hence, the desired reaction) throughout the subsurface.

In the second preferred embodiment, the surfactant is introduced into the contaminated subsurface zone 100. As in the first preferred embodiment, it is preferable that the injection well 18 is disposed into the contaminated subsurface zone 100 to a depth such that the screen 26 is disposed completely below the resting water table surface 110. In this configuration the introduction of the surfactant is forced into the saturated phase of the soil, below the water table surface 110, rather than allowing the surfactant to be introduced into the contaminated soil in the non-saturated or vadose zone, above the water table surface 110. The end reaction products resulting from the physical reaction between the surfactant and the contaminants that remain in the contaminated zone are then removed via the integrated dual-phase extraction process. It should, however, be noted that the integrated dual-phase extraction process, discussed below, also facilitates transport and circulation of the surfactant (and, hence, the desired reaction) throughout the contaminated subsurface zone 100.

In a third preferred embodiment, the co-solvent is introduced into the contaminated subsurface zone 100. It is desirable that the co-solvent is introduced into the contaminated subsurface zone 100 through the injection well 18. Preferably, the injection well 18 is disposed into the contaminated subsurface zone 100 to a depth such that the screen 26 is disposed completely below the resting water table surface 110. This configuration forces the introduction of the co-solvent into the saturated phase of the soil, below the water table surface 110, rather than allowing the co-solvent to be introduced into the contaminated soil in the non-saturated or vadose zone, above the water table surface 110. The end products from the reaction between the co-solvent, the contaminants that remain in the contaminated zone, and the fugitive vapors are then removed via the integrated dual-phase extraction process. It should, however, be noted that the integrated dual-phase extraction process, discussed below, also facilitates transport and circulation of the co-solvent (and, hence, the desired reaction) throughout the subsurface. The surfactant may also be introduced into the contaminated subsurface zone 100 in combination with a co-solvent.

An integrated dual-phase extraction process can be started before, during, or after the introduction of the product (and catalyst 24, as needed). The optional air supply 16 supplies air to the well casing 20. The vacuum pump 15 produces a vacuum in the drop tube 22 so that the drop tube 22 extracts gases and/or liquids through its distal opening 29 and/or its lateral wall apertures 28. The air flow 52 (from the surface air supply) or 152 (from below the ground surface) into the well casing 20 and the vacuum 58 in the drop tube 22 work together to create an extraction process that draws soil and groundwater contaminants and reaction end products through the extraction well pipe perforations 3 0 of the well casing 20 and into the plurality of lateral wall apertures 28 and/or open end 29 of the drop tube 22.

At any time during the integrated dual-phase extraction process, the optional air supply 16 may be controlled to alter the supply of air to the well casing 20, by either an increase or decrease. The air supply 16 to the well casing 20 assists extraction to occur at greater soil depths than would be possible with application of a vacuum alone. This extraction method allows for more effective extraction of integrated dual-phase flow from soil of various permeability and porosity. The preferred level of submersion of the drop tube 22 and the well casing 20, provides for extraction of contaminants and vapors that are present in both the unsaturated vadose zone, above the water table surface 110, and/or contaminants in the saturated zone, below the water table surface 110. After extraction begins, the water table surface 110 becomes dynamic, as indicated by the broken line 120. This phenomena provides a "sink" by gravity flow and flow by negative pressure for free floating and/or dissolved phase contaminants present in the saturated level to find their lowest resting place at or near the distal open end 29 of the drop tube 22, thereby concentrating the elements to be extracted near the entrance of the well casing 20 and drop tube 22. It is also preferable that the extracted elements be treated to produce an environmentally desirable product by a contaminant filter 32 in a treatment step. Prior to the treatment step, the vapor and liquid phases may be separated by a vapor/liquid separator 33. Such a separation process is disclosed in U.S. Pat. No. 5,050,676 (Hess, et al.), the disclosure of which is herein incorporated by reference.

Generally, the system 10 implements a combination of physical and/or chemical reaction of contaminants in a contaminated subsurface zone (including both contaminated soil and contaminated groundwater) and integrated dual-phase extraction of multiple phases of organic contaminants, reaction end products resulting from reaction and any remaining contaminants in one common stream. A combination of the reaction and the extraction is beneficial because the extraction process aids in the effectiveness of the reaction by inducing circulation of the product 12 throughout the contaminated subsurface zone 100.

Although a preferred depth of submersion for the injection well 18, and for the well apparatus 11 is indicated herein, it should be noted that the product 12 may be introduced into the contaminated subsurface zone 100 at any level, either above the water table surface 110, partially above and partially below the water table surface 110, or as preferred, completely below the water table surface 110. Similarly, it should be noted that although the preferred disposed level for the extraction well 20 and for the drop tube 22, of the extraction well apparatus 13, is indicated herein, it should be understood that both the extraction well 20 and drop tube 22 may be disposed at any level below the water table surface 110, or partially below and partially above the resting water table surface 110, or fully above the water table surface 110. Such variability in the depth to which the injection well 18 is disposed into the contaminated subsurface zone 100 allows for flexibility in the depth of introduction of the product 12 (and catalyst 24, as needed) into the contaminated subsurface zone 100 either in the unsaturated vadose zone, or in the saturated groundwater, or anywhere therebetween. Similarly, flexibility in the depth to which the extraction well 20 and the drop tube 22 is disposed allows for extraction of contaminants and vapors from the unsaturated vadose zone, the saturated groundwater zone, below the water table surface 110, or any combination thereof.

The foregoing description has been presented for purposes of illustration and description. It is not intended to be exhaustive or to limit the invention to the precise forms enclosed. Obvious modifications or variations are possible in light of the above teachings. Any and all such modifications and variations are intended to be included within the scope of this disclosure and are intended to be perceived as taught by the present invention.

Therefore, having thus described the invention, at least the following is claimed:

1. A soil and groundwater decontamination system for decontaminating a contaminated subsurface zone, the contaminated subsurface zone having a groundwater level below which is a groundwater zone and above which is a vadose zone, the vadose zone and the groundwater level having a capillary fringe therebetween, comprising:

an injection means for introducing a fluid into said contaminated subsurface zones, said fluid being able to react with subsurface contaminant and produce a reaction end product;

a fluid pumping means for delivering said fluid to said injection means;

a vacuum means for creating and maintaining a vacuum in at least a portion of said system;

an extraction means for extracting contaminant from the contaminated subsurface zone, said extraction means being in fluid communication with said vacuum means, said extraction means extracting the reaction end product from the contaminated subsurface zone and contaminant from the contaminated subsurface zone; and a fluid introducing means arranged and configured to introduce a fluid substantially adjacent and surrounding said extraction means, said extraction means being disposed within said fluid introducing means.

2. The soil and groundwater decontamination system of claim 1, further comprising:

a catalyst supply means for supplying a catalyst to said injection means.

3. The soil and groundwater decontamination system of claim 1, further comprising:

a phase separator means for separation of multiple phases extracted through said extraction means, said multiple phases comprising a gas phase and a liquid phase, wherein said phase separator means is in fluid communication with said extraction means.

4. The soil and groundwater decontamination system of claim 1, further comprising:

a contaminant filter means for treating extracted groundwater and vapor products, said contaminant filter means being in fluid communication with said extraction means.

* * * * *

(12) EX PARTE REEXAMINATION CERTIFICATE (7393rd)
United States Patent
Athens et al.

(10) Number: US 6,158,924 C1
(45) Certificate Issued: Mar. 2, 2010

(54) SOIL AND GROUNDWATER DECONTAMINATION SYSTEM WITH VACUUM EXTRACTION

(76) Inventors: Nick Athens, 1651 Hadaway Ct., Kennesaw, GA (US) 30152; David M. Goodrich, 142 Douglas Fir Dr., Waleska, GA (US) 30103

Reexamination Request:
No. 90/008,839, Sep. 10, 2007

Reexamination Certificate for:
Patent No.: 6,158,924
Issued: Dec. 12, 2000
Appl. No.: 09/295,022
Filed: Apr. 20, 1999

(51) Int. Cl.
*B09C 1/08* (2006.01)

(52) U.S. Cl. ............... 405/128.25; 166/268; 166/270.1; 166/275; 166/90.1; 405/128.45

(58) Field of Classification Search ............... None
See application file for complete search history.

(56) References Cited

U.S. PATENT DOCUMENTS

| | | | |
|---|---|---|---|
| 3,649,533 A | | 3/1972 | Reijonen et al. |
| 3,679,264 A | * | 7/1972 | Van Huisen ............ 299/4 |
| 5,172,764 A | | 12/1992 | Hajali et al. |
| 5,615,974 A | | 4/1997 | Land et al. |
| 5,622,450 A | | 4/1997 | Grant, Jr. |
| 6,146,104 A | * | 11/2000 | Mastroianni et al. ........ 417/54 |
| 6,280,625 B1 | * | 8/2001 | Jackson et al. ............ 210/617 |

OTHER PUBLICATIONS

In–Situ Groundwater Bioremediation. May 1995, Chpt. X of How to Evaluate Alternative Cleanup Technologies for Underground Storage Tank Sites: A Guide for Corrective Action Plan Reviewers. EPA 510–B–95–007. pp. X–iii, X–iv, and X–1 to X–4.*

Raetz et al. Field Application and Results of an Engineered Bioventing Process. in In Situ Aeration: Air Sparging, Bioventing, and Related Remediation Processes. editors: Hinchee et al., Battelle Press, 1995. pp. 419–432.*

D. Lowe, et al., "Technology Practices Manual for Surfactants and Cosolvents," Last updated: Feb. 1997 (CH2MHill) http://clu–in.org/PRODUCTS/AATDF/Toc.htm#Foreword.

(Continued)

*Primary Examiner*—Jeffrey L. Gellner

(57) ABSTRACT

A soil and groundwater decontamination system (10) and associated process are provided for soil and groundwater remediation. The system (10) and process utilizes both a physical or chemical reaction with the contaminants in a contaminated subsurface zone and extraction of the reaction end products and any remaining contaminants from the contaminated subsurface zone (100). In architecture, the soil and groundwater decontamination system (10) comprises an chemical product (12) that is introduced into an injection well (18). The injection well (18) is disposed into a passage provided in or adjacent to the contaminated subsurface zone (100) and allows the introduction of the chemical product (12) (and catalyst (24) if necessary) into the contaminated subsurface zone (100). The chemical product (12) reacts (physically or chemically) with contamination in the soil and groundwater and creates a reaction end product. The soil and groundwater decontamination system (10) further includes a vacuum pump (15) in fluid connection with a drop tube (22), and an optional air supply (16) in fluid communication with a well casing (18). The drop tube (22) includes an opening and is disposed longitudinally inside the wall casing (20). The reaction end products and remaining contaminants are drawn into an opening in the well casing (20) and into the opening disposed in the drop tube (22), thereby extracting the reaction end products and remaining contaminants from the soil and groundwater in a preferably integrated dual-phase flow of vapor phase and liquid phase in one common stream.

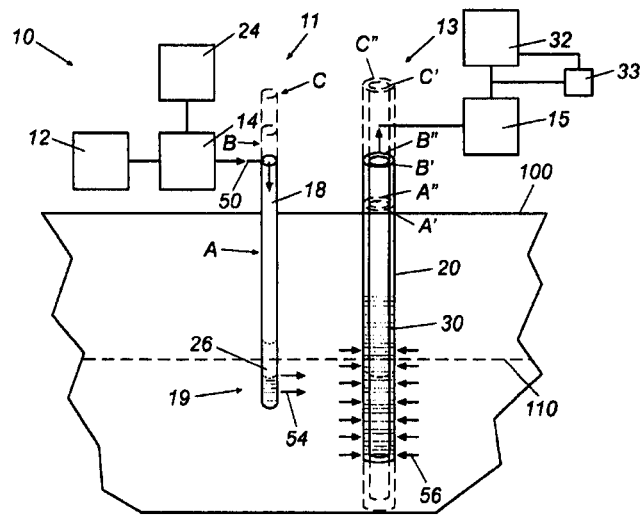

OTHER PUBLICATIONS

"In Situ Remediation Technology Status Report: Surfactant–Enhancements," USEPA, Office of Solid Waste and Emergency Response (5102W), EPA 542–K–94–003, Apr. 1995.

Jafvert, Chad T., "Surfactants/Cosolvents", Technology Evaluation Report TE–96–02 Prepared for GWRTAC http://www.epa.gov/tio/download/remed/surf_co.pdf, Dec. 1996.

Roote, Diane S., "Technology Status Report In Situ Flushing," TE–98–01, Prepared for Ground–Water Remediation Technologies Analysis Center (GWRTAC), Nov. 1998.

Jawitz, James W., et al. "Field Implementation of a Winsor Type I Surfactant/Alcohol Mixture for in Situ Solubilization of a Complex LNAPL as a Single–Phase Microemulsion," Environmental Science & Technology, vol. 32, No. 2, pp. 523–530. 1998.

Lowe, Donald F., et al., "Surfactants and Cosolvents for NAPL Remediation A Technology Practices Manual", Lewis Publishers, Copyright 1999, Chapters 2, 4–7, Appendix A.

Sabatini, David A., et al., "Surfactant–Enhanced Subsurface Remediation: Emerging Technologies" (ACS Symposium Series 594), American Chemical Society, Copyright 1995, Chapters 1, 11–15, 18–20.

Fountain, John C., "Technologies for Dense Nonaqueous Phase Liquid Source Zone Remediation," Technology Evaluation Report TE–98–02 (Dec. 1998). Prepared for Ground–Water Remediation Technologies Analysis Center (GWRTAC).

Wood, A. Lynn, et al., "Summary of the Remediation Technologies Development Forum—In Situ Flushing Action Team Meeting" (RDTF). 1998. Irving, TX. Sep. 14–15, 1998.

Sabatini, D.A., et al., "Surfactant–Enhanced DNAPL Remediation: Surfactant Selection, Hydraulic Efficiency, and Economic Factors," Environmental Research Brief. EPA. Washington, D.C. EPA/600/S–96/002, Aug. 1996.

"In Situ Remediation Technology Status Report: Surfactant Enhancements," , U.S. Environmental Protection Agency, EPA542–K–94–003, Apr. 1995.

"Field Applications of In–Situ Remediation Technologies", Chemical Oxidation, U.S. EPA Sep. 1998, 37 pages. EPA 542–R–98–008.

EPA, How To Evaluate Alternative Cleanup Technologies For Underground Storage Tank Sites, EPA 510–B–94–003, Chapter XI, pp. XI–1 to XI–40, May 1995.

Pezzullo, Joseph A., Advanced Methods for the In–Situ Remediation of Contaminated Soil and Groundwater, pp. 239 to 256, copyright 1998.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4 are cancelled.

New claims 5–12 are added and determined to be patentable.

*5. A soil and groundwater decontamination system for decontaminating a contaminated subsurface zone, the contaminated subsurface zone having a groundwater level below which is a groundwater zone and above which is a vadose zone, the vadose zone and the groundwater level having a capillary fringe therebetween, comprising:*

*a surfactant liquid;*

*an injection well disposed in said contaminated subsurface zone, said injection well configured to introduce said surfactant liquid into said contaminated subsurface zone, said surfactant liquid being able to physcially react with a subsurface contaminant and produce a reaction end product;*

*a pump for delivering said surfactant liquid to said injection well;*

*an extracton well configured to extract said reaction end product and contaminant from the contaminated subsurface zone, said extraction well comprising:*

*a well casing disposed in said contaminated subsurface zone, and*

*a drop tube disposed inside said well casing, where said reaction end product and contaminant are extracted through said drop tube;*

*a vacuum pump for creating and maintaining a vacuum in said drop tube; and*

*a fluid supply configured to introduce a fluid in said well casing substantially adjacent to and surrounding said drop tube.*

*6. The soil and groundwater decontamination system of claim 5, wherein a catalyst is introduced with said surfactant liquid to said contaminated subsurface zone through said injection well.*

*7. The soil and groundwater decontamination system of claim 5, further comprising:*

*a phase separator for separating multiple phases extracted through said drop tube, said multiple phases comprising a gas phase and a liquid phase.*

*8. The soil and groundwater decontamination system of claim 5, further comprising:*

*a contaminant filter for treating groundwater and vapor products extracted with said reaction end product and contaminant.*

*9. A soil and groundwater decontamination system for decontaminating a contaminated subsurface zone, the contaminated subsurface zone having a groundwater level below which is a groundwater zone and above which is a vadose zone, the vadose zone and the groundwater level having a capillary fringe therebetween, comprising:*

*an alcohol co-solvent liquid;*

*an injection well disposed in said contaminated subsurface zone, said injection well configured to introduce said co-solvent liquid into said contaminated subsurface zone, said co-solvent liquid being able to physically react with a subsurface contaminant and produce a reaction end product;*

*a pump for delivering said co-solvent liquid to said injection well;*

*an extraction well configured to extract said reaction end product and contaminant from the contaminated subsurface zone, said extraction well comprising;*

*a well casing disposed in said contaminated subsurface zone, and*

*a drop tube disposed inside said well casing, where said reaction end product and contaminant are extracted through said drop tube;*

*a vacuum pump for creating and maintaining a vacuum in said drop tube; and*

*a fluid supply configured to introduce a fluid in said well casing substantially adjacent to and surrounding said drob tube.*

*10. The soil and groundwater decontamination system of claim 9, wherein a catalyst is introduced with said co-solvent liquid to said contaminated subsurface zone through said injection well.*

*11. The soil and groundwater decontamination system of claim 9, further comprising:*

*a phase separator for separating multiple phases extracted through said drop tube, said multiple phases comprising a gas phase and a liquid phase.*

*12. The soil and groundwater decontamination system of claim 9, further comprising:*

*a contaminant filter for treating groundwater and vapor products extracted with said reaction end product and contaminant.*

\* \* \* \* \*